United States Patent [19]

Ona et al.

[11] 4,332,715
[45] Jun. 1, 1982

[54] VINYL RESIN COMPOSITIONS COMPRISING AN ORGANOPOLYSILOXANE

[75] Inventors: Isao Ona, Sodeuramachi; Masaru Ozaki, Ichihara, both of Japan

[73] Assignee: Toray Silicone Limited, Tokyo, Japan

[21] Appl. No.: 282,842

[22] Filed: Jul. 13, 1981

[30] Foreign Application Priority Data

Jul. 31, 1980 [JP] Japan ................................ 55/105378

[51] Int. Cl.$^3$ .............................................. C08K 5/54
[52] U.S. Cl. .................................... 524/265; 556/440
[58] Field of Search .................... 260/31.2 R; 556/440

[56] References Cited

FOREIGN PATENT DOCUMENTS 50-121344 of 1975 Japan .
52-6751 of 1977 Japan .
1460128 of 1978 United Kingdom .

Primary Examiner—Joseph L. Schofer
Assistant Examiner—N. Sarofin
Attorney, Agent, or Firm—George A. Grindahl

[57] ABSTRACT

Vinyl resin compositions are disclosed which possess improved lubricity, mold releasability, water repellency, abrasion resistance, gloss and/or processability. These improvements are obtained by mixing with the vinyl resin a minor portion of an organopolysiloxane which bears one or more acyloxyhydrocarbyl radicals bonded to silicon in the organopolysiloxane.

6 Claims, No Drawings

VINYL RESIN COMPOSITIONS COMPRISING AN ORGANOPOLYSILOXANE

BACKGROUND OF THE INVENTION

This invention relates to silicon-containing vinyl resin compositions. More precisely, this invention concerns vinyl resin compositions which are comprised of an organopolysiloxane and which possess lubricity, mold releasability, water repellency, abrasion resistance, gloss and processability.

Vinyl resins have been used widely in molded products, cast products, laminates, films, fibers, bonding agents, rubbers and paints. Since properties such as lubricity, mold-releasability, water repellency, abrasion resistance, gloss, processability and mechanical strength are required in many cases, attempts have been made to improve these properties by compounding additives such as silicone oil, waxes, higher alcohols and metal soaps with the vinyl resin. In particular, the addition of silicone oil can remarkably improve lubricity and mold-releasability of a vinyl resin. However, silicone oil is poorly compatible with vinyl resins so that there is the drawback that many problems occur due to the separation and leakage of silicone oil from the resins. In order to overcome these problems, both silicone oil and silicone rubber were added together to thermoplastic resins in Kokai Japanese Patent No. Sho 50(1975)-121344. However, leakage of silicone oil could not be prevented sufficiently. In addition, there was a drawback that the original characteristics of the thermoplastic resins were modified due to the addition of silicone rubber. In Japanese Patent No. Sho 52(1977)-6751, an organopolysiloxane having a —OCR$^1$ group directly bound to a silicon atom, where R$^1$ represents substituted or unsubstituted monovalent hydrocarbon radicals, was added to vinyl chloride resins. In this case, since the —OCR$^1$ group is directly bound to the silicon atom, hydrolysis occurs easily and gelation, occurring due to the presence of moisture in the air, markedly impairs the lubricity and appearance of the vinyl chloride resin. In Japanese Patent No. Sho 53(1978)-44178, an organopolysiloxane having a carboxyl group bonded to silicon via a Si—C bond was compounded with thermoplastic materials. In this case, the system is quickly corroded, due to the presence of carboxyl groups, and the functions of the compound are impaired or disappear, due to the occurrence of a reaction with basic compounds.

BRIEF SUMMARY OF THE INVENTION

It is an object of this invention to provide organopolysiloxane-containing vinyl resins which do not leak, i.e. do not exude organopolysiloxane. It is another object of this invention to provide improved vinyl resin which possess lubricity, mold-releasability, water-repellency, abrasion resistance, gloss and processability.

These objects, and others which will become apparent upon considering the following disclosure and appended claims, are obtained by mixing with a vinyl resin component an organopolysiloxane component which bears to least one silicon-bonded acyloxyhydrocarbyl radical.

DETAILED DESCRIPTION OF THE INVENTION

The present invention relates to a composition comprising (a) 100 parts by weight of a vinyl resin component and (b) from 0.01 to 20 parts by weight of an organopolysiloxane component having the formula

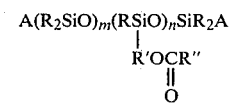

wherein R denotes a substituted or unsubstituted monovalent hydrocarbon radical, R' denotes a divalent hydrocarbon radical, R" denotes an alkyl radical, A denotes an R radical or an R'OCOR" radical, m and n are each zero or a positive integer and the sum of m+n has a value of from 1 to 2000, there being at least one R'OCOR" radical per molecule of organopolysiloxane.

Vinyl resins used as component (a) in this invention are well-known materials and include vinyl homopolymers, such as polyvinyl chloride, polyvinyl acetate, polyvinyl alcohol, polyvinyl acetal, polyvinyl formal, polyvinyl butyral, polyethylenes, polypropylenes, polyacrylonitriles, polyacrylates, polymethacrylates, polyvinylidene chloride, polyvinyl fluoride and other vinyl homopolymers; vinyl copolymers, such as vinyl chloride/vinylidene chloride copolymer, vinyl chloride/methyl acrylate copolymer, vinyl chloride/methyl methacrylate copolymer, vinyl chloride/acrylonitrile copolymer, vinyl chloride/styrene copolymer, vinyl chloride/ethylene copolymer, styrene/acrylonitrile copolymer, methacrylate/acrylate copolymer, acrylonitrile/butadiene copolymer, acrylonitrile/butadiene/styrene copolymer, vinyl acetate/vinyl chloride copolymer, vinyl acetate/ethylene copolymer, vinyl acetate/acrylic acid copolymer, vinyl acetate/acrylonitrile copolymer, vinyl acetate/acrylate copolymer, vinyl acetate/maleic acid copolymer, vinyl acetate/styrene copolymer, vinyl acetate/vinyl alcohol copolymer, vinyl acetate/vinyl chloride/vinyl alcohol copolymer, vinyl acetate/vinyl chloride/ethylene copolymer and other vinyl copolymers; rubbery elastomers, such as ethylene/propylene rubber, ethylene/propylene/diene rubber, butyl rubber, acrylic rubber, acrylonitrile/butadiene rubber and chloroprene rubber and, copolymers of vinyl resins with resins other than vinyl resins. The vinyl resins used in this invention can also be mixtures of two or more types of the above vinyl resins. In particular, those which are most suitable among the vinyl resins mentioned above are polyvinyl acetate and its copolymers, polyacrylate and its copolymers, and polymethacrylate and its copolymers. In the case of these preferred copolymers the proportion of vinyl acetate or acrylate or methacrylate in the copolymer is at least 2 percent by weight.

Component (a) can have any form, such as a solution, an emulsion, a paste, a latex, a powder or a solid form.

Organopolysiloxanes used as component (b) in the compositions of this invention are expressed by the formula

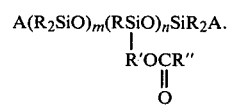

In this formula each R represents a substituted or unsubstituted monovalent hydrocarbon radical, such as alkyl radicals such as methyl, ethyl, propyl, octyl and tridecyl; cycloaliphatic radicals, such as the cyclohexyl radical; alkenyl radicals, such as vinyl and allyl radicals; aryl radicals, such as the phenyl radical, or said monovalent hydrocarbon radicals in which hydrogen atoms are replaced with halogen atoms or cyano radicals. It is not always necessary that all the R groups in a single molecule are identical. R' represents divalent hydrocarbon radicals, such as alkylene radicals, such as —CH$_2$CH$_2$—, —CH$_2$CH$_2$CH$_2$—, —CH$_2$(CH$_3$)CH—, —CH$_2$CH(CH$_3$)CH$_2$— and —(CH$_2$)$_4$—, or alkylene arylene radicals, such as —(CH$_2$)$_2$—C$_6$H$_4$— or —(CH$_2$)$_4$CH$_2$—CH—CH$_2$—C$_6$H$_5$, R" represents an alkyl radical, such as methyl, ethyl, propyl, decyl and octadecyl. A represents R or R'OCOR" radicals.

In the formula for component (b) m and n are 0 or integers of 1 or greater and m+n must be 1 to 2000. If m+n is 0, the effects on the lubricating ability and mold-releasing ability are poor, while if m+n exceeds 2000, the dispersibility of the component (b) in vinyl resins is reduced. Thus, m+n preferably ranges from 10 to 1000. If n=0 at least one A radical must be a R'OCOR" radical.

These organopolysiloxanes can impart lubricating ability, mold-releasing ability, water repellency, abrasion resistance and gloss to vinyl resins due to the presence of siloxane units and also can impart affinity and compatibility with vinyl resins due to the presence of one or more acyloxyhydrocarbyl radicals of the formula R'OCOR" so that the transparency of vinyl resins is not impaired and the procesability is excellent. Therefore, leakage of organopolysiloxanes from the vinyl resins does not occur. Since the R'OCOR" group is extremely stable, the various effects mentioned above are permanently maintained. In particular, in the cases when polyvinyl acetate and its copolymers, polyacrylate and its copolymers or polymethacrylate and its copolymers are used as vinyl resins, the compatibility and affinity with organopolysiloxanes having the R'OCOR" group are extremely excellent.

Organopolysiloxane component (b) is well known and can be prepared by any one of several methods. U.S. Pat. Nos. 2,550,205; 2,691,032; 2,770,633; 2,891,980; 2,906,735 and 2,922,806 are hereby incorporated herein by reference to show how to prepare organopolysiloxanes which are suitable as component (b) in the compositions of this invention. In particular, an organopolysiloxane having the formula CH$_3${(CH$_3$)$_2$SiO}$_m${(CH$_3$)(H)SiO}$_n$Si(CH$_3$)$_3$ can be reacted with

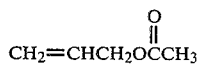

in the presence of a platinum-containing catalyst to prepare an organopolysiloxane component (b) for the compositions of this invention having the formula

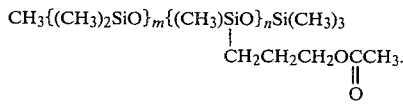

The proportion of component (b) in the composition of this invention ranges from 0.01 to 20 parts by weight, preferably 0.1 to 10 parts by weight, based on 100 parts by weight of component (a).

The compositions of this invention can be prepared by simply mixing components (a) and (b) in any suitable manner. If a solvent is used, a solvent which is common to both components (a) and (b) is selected. If component (a) is available in an emulsion form, component (b) is emulsified using emulsifiers, such as sulfates of higher alcohols, alkylbenzene sulfonates and polyhydroxyalkylene adducts of higher fatty acids, and then emulsified component (b) is added to emulsion (a). If component (a) is available in a solid form such as chips or pellets, component (b) can be added when the chips or pellets are molded, or the chips or pellets can be melted and then component (b) added directly to the melt. That is, component (b) can be added to component (a) at any stage from the production process of component (a) to the final processing stage of the resin.

In addition to components (a) and (b), a variety of conventional additives can be compounded in the compositions of this invention. Examples are as follows: dry silica, wet silica, magnesium silicate, aluminum silicate, calcium carbonate, clay, mica, talc, titanium oxide, aluminum oxide, magnesium oxide, red iron oxide, magnetic iron oxide, various metal powders, carbon black, asbestos, glass fiber, glass beads, phthalates, phosphates, metal soaps, silicone oil, silane coupling agents, resins, isocyanates, waxes, higher alcohols, organic tin fatty acid salts, thermoplastic resins other than vinyl resins; such as polyurethanes and polyamides and polyesters, heat curable resins; such as melamine, phenol, urea, furan, xylene, alkyd, epoxy and silicone resins, natural rubbers and synthetic rubbers. In addition to these additives, the following known agents can be compounded in the compositions of this invention: fillers, plasticizers, stabilizers, flame retardants, U.V. absorbents, lubricating agents, surfactants, antistatics, antioxidants, antifungal agents, foaming agents, coloring agents and adhesiveness imparting agents.

The compositions of this invention can be used in all the uses of the conventional vinyl resins. For example, the compositions can be used in molded products, cast products, laminates, films, fibers, bonding agents, rubbers and paints. When the compositions of this invention are used as molded products, the products exhibit excellent mold-releasing ability and internal lubricating ability. When used as films or resin plates, the products exhibit excellent transparency and non-blocking character. When used as paints, the paint film exhibits excellent gloss, smoothness and water repellency. If magnetic powders, carbon black or dyes are compounded with components (a) and (b) constituting the compositions of this invention, the products can be used as excellent magnetic toners. If binders or other additives are compounded with the compositions constituting these magnetic toners, the products are suitable as magnetic paints for magnetic tapes and magnetic disks.

The following examples are disclosed to further illustrate, but not to limit, the present invention. All parts and percentages are on a weight basis. Viscosities were measured at 25° C.

EXAMPLE 1

The organopolysiloxanes that were used in this example, and their identifier symbols, are as follows:

| Organopolysiloxane | Identifier |
|---|---|
| CH$_3$(SiO)$_{350}$(SiO)$_6$Si(CH$_3$)$_3$ with CH$_3$, CH$_3$, CH$_3$, CH$_2$CH$_2$CH$_2$OCCH$_3$ (=O) substituents | A |

-continued

| Organopolysiloxane | Identifier |
|---|---|
| (1500 centistokes) | |
| Polydimethylsiloxane (1000 centistokes) | B |
| Methylphenylpolysiloxane (1000 centistokes) | C |
| Methyltridecylpolysiloxane (900 centistokes) | D |

The vinyl resins that were used in this example, and their identifier symbols, are as follows:

| Vinyl Resin | Identifier |
|---|---|
| Polyvinyl chloride (Sumilite SX-11) (Sumimoto Chemical Industries, Ltd.) | PVC |
| Vinyl chloride/5% vinyl acetate (Denka Vinyl M-70) (Denki Kagaku K.K.) | PVC/PVA-5% |
| Vinyl chloride/10% vinyl acetate (Denka Vinyl MM-90) (Denki Kagaku K.K.) | PVC/PVA-10% |
| Ethylene/28% vinyl acetate (Evalex) (Mitsui Polychemical Co., Ltd.) | PE/PVA-28% |
| Polyethylene (Mirason 24H) (Mitsui Polychemical Co., Ltd.) | PE |
| Polypropylene (Noblen H-501) (Sumimoto Chemical Industries Co., Ltd.) | PP |
| Polymethylmethacrylate (Sumipex LG) (Sumimoto Chemical Industries Co., Ltd.) | PMMA |

Two amounts (0.6 parts and 1.5 parts) of each of the above-listed organopolysiloxanes were added to 100 part portions of each of the above-listed vinyl resins to provide 56 compositions (14 of this invention and 42 comparison) which were cast as films having a thickness of 1.5 mm. Each film was examined macroscopically for leakage before and after being heated at 70° C. for 7 days in a hot air circulation type oven. The results are summarized in Table I.

The leakage on the film surface was not found in the film prepared using Siloxane (A) specified in this invention and the film quality was excellent compared to those using the conventional silicone oils in the comparative examples. Especially when vinyl acetate resins, polymethacrylate resins, or polyacrylate resins were used as vinyl resins, the affinity and compatibility with Siloxane (A) were found to be particularly excellent. The reason for this seemed to be that these resins contain a group similar to the R'OCOR" group of the organopolysiloxane.

Based on the results mentioned above, the compositions of this invention were expected to be useful in the fields using combinations of vinyl resins and silicone oils and in particular, in toners used for electrophotography and static printing, and magnet forming phase of the magnetic recording media such as magnetic tapes and magnetic disks.

TABLE I

| Vinyl Resin Identifier | Siloxane[1] Identifier | Parts | Leakage[2] Before Heating | After Heating[3] |
|---|---|---|---|---|
| PVC | A | 0.6 | 0 | + |
| " | B | " | ++ | x |
| " | C | " | ++ | x |
| " | D | " | + | x |
| " | A | 1.5 | 0 | + |
| " | B | " | ++ | x |
| " | C | " | ++ | x |

TABLE I-continued

| Vinyl Resin Identifier | Siloxane[1] Identifier | Parts | Leakage[2] Before Heating | After Heating[3] |
|---|---|---|---|---|
| " | D | " | + | x |
| PVC/PVA-5% | A | 0.6 | 0 | 0 |
| " | B | " | ++ | x |
| " | C | " | ++ | x |
| " | D | " | + | ++ |
| " | A | 1.5 | 0 | 0 |
| " | B | " | ++ | x |
| " | C | " | ++ | x |
| " | D | " | + | x |
| PVC/PVA-10% | A | 0.6 | 0 | 0 |
| " | B | " | ++ | x |
| " | C | " | ++ | x |
| " | D | " | + | ++ |
| " | A | 1.5 | 0 | 0 |
| " | B | " | ++ | x |
| " | C | " | ++ | x |
| " | D | " | + | x |
| PE/PVA-28% | A | 0.6 | 0 | 0 |
| " | B | " | ++ | x |
| " | C | " | ++ | x |
| " | D | " | + | ++ |
| " | A | 1.5 | 0 | 0 |
| " | B | " | ++ | x |
| " | C | " | ++ | x |
| " | D | " | + | x |
| PE | A | 0.6 | 0 | + |
| " | B | " | ++ | x |
| " | C | " | x | x |
| " | D | " | + | x |
| " | A | 1.5 | 0 | ++ |
| " | B | " | ++ | x |
| " | C | " | x | x |
| " | D | " | + | x |
| PP | A | 0.6 | 0 | + |
| " | B | " | ++ | x |
| " | C | " | x | x |
| " | D | " | + | x |
| " | A | 1.5 | 0 | ++ |
| " | B | " | ++ | x |
| " | C | " | x | x |
| " | D | " | + | x |
| PMMA | A | 0.6 | 0 | 0 |
| " | B | " | ++ | x |
| " | C | " | ++ | x |
| " | D | " | + | ++ |
| " | A | 1.5 | 0 | 0 |
| " | B | " | ++ | x |
| " | C | " | ++ | x |
| " | D | " | + | x |

[1] Compositions containing Siloxane A are compositions of this invention; all others are comparative examples.
[2] 0 denotes no leakage; + denotes a trace amount of leakage; ++ denotes slight leakage; x denotes significant leakage.
[3] Heating was for 7 hours at 70° C.

EXAMPLE 2

Organopolysiloxane (A) used in Example 1 was added in a proportion of 1 part based on 100 parts of emulsion for paints primarily consisting of polyvinyl acetate (clear) and the mixture was mixed at a rate of 3000 times/min. with a homogenizer for 30 minutes. Subsequently, the composition was coated over an aluminum test panel (100 mm × 100 mm × 0.3 mm) to form a film with a thickness of about 100 μm and a transparent glossy film was formed by drying. When an adhesive tape (cellophane tape by Nichiban K.K.) was adhered on the coated film surface under pressure and peeled (this process was repeated five times), the peeling resistance was found to be extremely low and no abnormalities were found on the coated surface, indicating excellent non-blocking character. When the aluminum test panel having the formed film was boiled in boiling water for one hour, transparency and gloss were not dissipated.

The same test as mentioned above was conducted in the cases using dimethylpolysiloxane (B) and methylphenylpolysiloxane (C) used in Example 1 as comparative examples. Although both gloss and the non-blocking character were found to be identical to those found in the case using organopolysiloxane (A), the coated film was found to be cloudy after the boiling water test.

EXAMPLE 3

An organopolysiloxane (E) having a viscosity of 1200 centistokes and the following formula

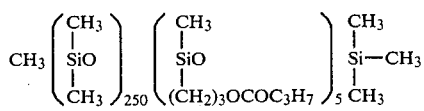

was added in a proportion of 0.6 parts and 1.5 parts to 100 parts of polyvinyl chloride or vinyl chloride/vinyl acetate copolymer with a vinyl acetate content of 10% used in Example 1, and the same experiment as in Example 1 was conducted. Leakage of organopolysiloxane (E) on the film surface was not found in any cases.

That which is claimed is:

1. A composition comprising
   (a) 100 parts by weight of a vinyl resin component and
   (b) from 0.01 to 20 parts by weight of an organopolysiloxane component having the formula

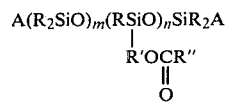

wherein R denotes a substituted or unsubstituted monovalent hydrocarbon radical, R' denotes a divalent hydrocarbon radical, R" denotes an alkyl radical, A denotes an R radical or an R'OCOR" radical, m and n are each zero or a positive integer and the sum of m+n has a value of from 1 to 2000, there being at least one R'OCOR" radical per molecule of organopolysiloxane.

2. The composition according to claim 1 wherein the vinyl resin component is a vinyl acetate resin.

3. The composition according to claim 1 wherein the vinyl resin component is an acrylate resin.

4. The composition according to claim 1 wherein the vinyl resin component is a methacrylate resin.

5. The composition according to claims 1, 2, 3 or 4 wherein the organopolysiloxane component (b) has the formula

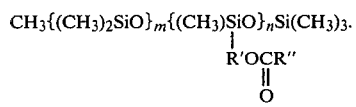

6. The composition according to claims 1, 2, 3 or 4 wherein the organopolysiloxane component (b) has the formula

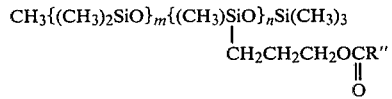

* * * * *